Patented June 16, 1953

2,642,403

UNITED STATES PATENT OFFICE 2,642,403

CELLULAR PLASTICS CONTAINING SATURATED AND UNSATURATED POLYESTER RESINS

Eli Simon, Los Angeles, and Frank W. Thomas, Burbank, Calif., assignors to Lockheed Aircraft Corporation, Burbank, Calif.

No Drawing. Application January 11, 1951, Serial No. 205,605

14 Claims. (Cl. 260—2.5)

This invention relates to foamed or cellular plastic products and relates more particularly to cellular resin-polyester plastics incorporating both saturated and unsaturated polyester resins.

In certain copending applications such as Serial No. 77,058 filed February 17, 1949 now Patent No. 2,591,884 granted April 8, 1952 and Serial No. 194,934 filed November 9, 1950, we have disclosed cellular plastic compositions adapted to be "foamed in place" and that are prepared by mixing a polyisocyanate, a saturated polyester resin, a foam stabilizer, etc. and then pouring the resultant mixture into a cavity, mold, or the like, to react and foam up at atmospheric pressure. We have found that we can produce a cellular or foamed plastic of controllable uniform cell size, of controllable density and that has excellent adhesion or bond strength when thus poured in place by employing a combination or mixture of saturated and unsaturated polyester resins in the isocyanate foaming system. We are aware that attempts have been made by others to employ unsaturated polyester resins in the production of foamed or cellular plastics by using compounds such as $NH_4HCO_3$ for liberating gas at elevated temperatures to form the cells but during the period in which the gas is being liberated the polymerization of the unsaturated polyester must be very carefully controlled by balancing the catalyst against an inhibitor to effectively utilize the gas being liberated and to prevent the collapse of the foam cells. We have attempted to prepare such unsaturated polyester resin foamed plastics with poor success, particularly where large volume sections or masses of the cellular plastic are required.

It is, therefore, an object of the present invention to provide for the production of cellular plastics of controlled uniform cell size, controlled or selected density and of superior bond strength without depending upon or requiring a careful or delicate catalyst balance. We have discovered that the reaction between the saturated polyester and polyisocyanate as well as the reaction between the polyisocyanate and the unsaturated polyester resin serves to stabilize the foaming system to produce excellent uniformity in cell structure, density and strength. The polyester resins as utilized in the formulations of the present invention comprise blends, mixtures, or combinations of saturated and unsaturated polyesters in preferred or selected proportions and the polyisocyanate serves as a cross linking agent for the saturated polyester as well as being reactive with the unsaturated polyester primarily through its free carboxyl and hydroxyl groups. Since the unsaturated polyester resin prior to cross linking with ethylenic-containing compounds, is essentially a linear polymer, it couples with the polyisocyanate through the terminal reactive groups serving to increase the chain length without causing thermosetting of the resin. To obtain a cellular or foamed plastic product that is heat stable, we prefer to add unsaturated ethylenic-containing compounds that cross link with the unsaturated polyester resin by addition polymerization in the presence of a peroxide type catalyst.

Another object of the invention is to provide formulations for making cellular plastics of the class referred to that are relatively slow in reacting, thus permitting ample time for mixing and pouring and that are quite fluid, thus facilitating the pouring of the reactant mixture. These characteristics materially extend the potential applications of the cellular products.

Still another object of the invention is to provide cellular plastics that have superior uniform as-foamed or as-poured bond strengths with practically all solids such as metals, fibre glass-polyester resin laminates, etc. and that are capable of transmitting micro wave energy, such as employed in radar, with a minimum of loss. These attributes well adapt the foams for use in radomes, aircraft control surfaces, and the like, where high strengths are required with or without the need for the transmission of micro wave energy.

Other objectives and advantages will become apparent from the following detailed description of typical preferred examples and of the manner of preparing the same.

The invention provides, generally, the preparation or mixing of a polyisocyanate, a saturated polyester resin, an unsaturated polyester resin, a catalyst, a monomer, a foam stabilizing agent and certain additives, if desired, and the pouring or application of this reactant mixture to react at normal room temperatures and atmospheric pressure with or without a post-curing at somewhat elevated temperatures.

The polyisocyanate is preferably, though not necessarily, meta-toluene diisocyanate. The diisocyanate is used in the proportion of from 17 to 80 parts by weight for each 100 parts by weight of the total resin (both saturated and unsaturated polyester resins). A preferred range is from 25 to 45 parts by weight of the meta-toluene diisocyanate for each 100 parts (total) of the resins. Excellent results are obtained when a high molecular weight thermoplastic film forming polymeric resin additive is employed with or added to the meta-toluene diisocyanate. The high molecular weight polymeric resin additives that we have found to be useful include: ethyl cellulose, polymeric chlorinated natural rubber, benzyl cellulose, natural rubber, polymeric vinyl chloride-vinyl acetate copolymers, polyvinyl chloride, polyvinyl acetate, polystyrene, polydichlorostyrene, polymeric acrylate and methacrylate resins and their copolymers, polyvinyl butyral.

In general, a concentration of the high molecular weight polymeric thermoplastic resin additive or additives of approximately 2 grams for each 100 grams of the meta-toluene diisocyanate gives excellent results. The concentrations or proportions of the individual additives depend to a considerable extent upon the nature of the additive and the concentration of the additive is somewhat dependent upon its respective viscosity. For example, the polymeric chlorinated natural rubber may be used in the proportion of from 5 to 20 grams for each 100 grams of the meta-toluene diisocyanate and the benzyl cellulose and polymeric vinyl chloride-vinyl acetate copolymers may be employed in the proportion of from one-half (½) to 10 grams for each 100 grams of the meta-toluene diisocyanate. For certain specific applications we have found that 2 grams, 4 grams and 6 grams respectively of the thermoplastic resin additive, such as ethyl cellulose, for each 100 grams of the meta-toluene diisocyanate are valuable in obtaining products of certain desired physical properties and characteristics. Ethyl cellulose has been found to be particularly advantageous in the formulations of the invention. Satisfactory results are obtained using commercial grades of ethyl cellulose resins wherein the substitution values are between 2.15 and 2.60 ethoxyl groups for each glucose unit, that is where the ethoxyl content is from 35% to 50%. A preferred ethoxyl content range of the ethyl cellulose resin is from 45.0 to 49.5%. The concentration of the ethyl cellulose in the reactant polyester resin-meta-toluene diisocyanate systems of the invention is from 0.30 gram to 15 grams of the ethyl cellulose for each 100 grams of the meta-toluene diisocyanate, a preferred concentration being between ½ and 6 grams of the ethyl cellulose for each 100 grams of the diisocyanate. The viscosity of the ethyl cellulose resins which we prefer to employ is between 7 and 200 centipoises and preferably between 50 and 100 centipoises, the viscosity being determined from a 5% by weight concentration of the ethyl cellulose in a solution of from 70 to 80 parts by weight of toluene with from 30 to 20 parts by weight of ethanol-denatured 2B ethyl alcohol of 95% strength, the solution being at 25° C. The above named high molecular weight thermoplastic film forming polymeric resin additives are soluble in meta-toluene diisocyanate and may or may not react therewith and their functions are to assist in stabilizing the foam during the reaction, permit the employment of higher water contents and to increase the elasticity of the cell walls during the foaming of the reactant mixture.

The unsaturated resins employed in the cellular plastic formulations are polymerizable unsaturated alkyd resins. These resins may have an acid number of from 25 to 60 and the ratio of their hydroxyl groups to their carboxyl groups is approximately 1 to 1 with preferably a slight excess of the hydroxyl groups. The following are formulae suitable for the preparation of unsaturated alkyd resins suitable for incorporation in the cellular plastic producing reactant mixtures:

Resin I

| | Mols |
|---|---|
| Diethylene glycol | 6.3 |
| Fumaric acid | 5 |
| Sebacic acid | 1 |

(Acid number of from 25 to 60 and preferably approximately 45.)

Resin II

| | Mols |
|---|---|
| Ethylene glycol | 5.2 |
| Maleic anhydride | 4 |
| Adipic acid | 1 |

(Acid number of from 25 to 60 and preferably about 40.)

Resin III

| | Mols |
|---|---|
| Diethylene glycol | 1.1 |
| Maleic anhydride | 1 |

(Acid number of from 25 to 60 and preferably about 40.)

The saturated polyester resins which we prefer to employ may be defined as alkyd resins which, when catalyzed with a peroxide type catalyst, will not cross link with vinyl type compounds such as styrene, methyl methacrylate and acrylonitrile to form a thermosetting polymer. The acid number of these resins may range between 10 and 60 and the ratio of the hydroxyl groups to the carboxyl groups is approximately 2 to 1 in most cases. The following are formulae for saturated polyester resins which we have found to be satisfactory for use in the reactant cellular plastic producing mixture of the invention:

Resin A

| | Mols |
|---|---|
| Trimethylol propane | 4 |
| Adipic acid | 2½ |
| Phthalic anhydride | ½ |

(The acid number is between 10 and 45 and preferably between 15 and 25.)

Resin B

| | Mols |
|---|---|
| Glycerol | 3 |
| Pantaerythritol | 1 |
| Adipic acid | 2½ |
| Phthalic anhydride | 1 |

(The acid number is preferably approximately 60.)

Resin C

| | Mols |
|---|---|
| Trimethylol propane | 2 |
| Trimethylol ethane | 2 |
| Adipic acid | 2½ |
| Phthalic anhydride | ½ |

(The acid number is preferably between 15 and 20.)

Resin D

| | Mols |
|---|---|
| Oxalic acid | 2½ |
| Trimethylol propane | 4 |
| Dimer acids | ¼ |

(The acid number is preferably between 10 and 25.)

Resin E

| | Mols |
|---|---|
| Oxalic acid | 2½ |
| Trimethylol propane | 3 7/8 |
| Dimer acids | 1/8 |

(The acid number is preferably between 10 and 25.)

Resin F

|  | Mols |
|---|---|
| Trimethylol propane | 4 |
| Dimer acids | ½ |
| Phthalic anhydride | ½ |
| Adipic acid | 1 |

(The acid number is preferably between 15 and 35.)

Resin G

|  | Mols |
|---|---|
| Trimethylol propane | 4 |
| Dimer acids | ½ |
| Phthalic anhydride | ½ |
| Adipic acid | 2 |

(The acid number is preferably between 20 and 30.)

Resin H

|  | Mols |
|---|---|
| Glycerol monoricinoleate | 3 |
| Trimethylol propane | 8 |
| Adipic acid | 5½ |
| Monoethyl phosphoric acid | 2 |
| Phthalic anhydride | 1 |

(The acid number is preferably from 10 to 20.)

Resin I

|  | Mols |
|---|---|
| Trimethylol propane | 4 |
| Dimer acids | ½ |
| Phthalic anhydride | 1½ |
| Adipic acid | 1 |

(The acid number is preferably approximately 55.)

Resin J

|  | Mols |
|---|---|
| Trimethylol propane | 4 |
| Dimer acids | ½ |
| Phthalic anhydride | 1 |
| Adipic acid | 1 |

(The acid number is preferably between 15 and 30.)

Resin K

|  | Mols |
|---|---|
| Trimethylol propane | 4 |
| Dimer acids | ½ |
| Phthalic anhydride | ½ |
| Adipic acid | 1½ |

It will be noted that Resins D, E, F, G, H, and I are oil modified. The dimer acids included in certain of the above examples of the saturated polyester resin formulations are dimeric polymers of unsaturated fatty acids such as dimerized linoleic or linolenic acids. These dimer acids may be prepared by heating the methyl esters of polyunsaturated acids such as linoleic or linolenic acids at high temperatures. This may be represented diagrammatically by a Diels-Alder reaction to form the dilinoleic acid (dibasic unsaturated acid) as follows:

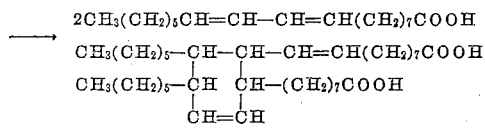

The ratio or proportion of the unsaturated alkyd resin to the saturated resin may be varied considerably. In practice this ratio may be from 20 parts by weight of the unsaturated resin to 60 parts by weight of the saturated resin; to 60 parts by weight of the unsaturated resin to 20 parts by weight of the saturated resin. The preferred proportion is approximately 30 parts by weight of the unsaturated resin to approximately 30 parts by weight of the saturated resin. It should be observed that the meta-toluene diisocyanate-ethyl cellulose solutions may be used in practically all of the formulations.

The catalyst which we employ is of the peroxide type such as benzoyl peroxide, lauroyl peroxide and bis (2,4-dichlorobenzoyl) peroxide. It has been found desirable in most instances to use benzoyl peroxide as the catalyst. The catalyst is used in the proportion of from ½ to 5% by weight of the unsaturated polyester resin with the preferred proportion being approximately 2% of the unsaturated polyester resin.

The monomer or monomers which we incorporate in the reactant mixture are unsaturated ethylenic-containing compounds. The following have been found to be practical and effective as monomers: styrene, styrene-divinyl benzene mixtures, methyl methacrylate, butyl methacrylate, acrylonitrile, diallyl phthalate, diallyl benzene phosphonate, vinyl acetate, glycol diacrylate, diallyl maleate, and methyl-chloroacrylate.

The amount or proportion of the monomer employed may range between 10 and 50 parts by weight for each 100 parts by weight of the unsaturated polyester resin with the preferred range being between 20 and 40 parts by weight of the monomer for each 100 parts by weight of the unsaturated polyester.

The invention contemplates the inclusion in the reactant foam producing mixture of one or more additives which we will term foam stabilizers. We have found that several different classes or types of such additives are effective in facilitating the production of superior high strength, low density cellular plastics of substantially uniform cell size, such additives including quaternary ammonium bentonite complexes, metallic soap powders and metallic leafing powders. The bentonite complexes or salts are produced by the reaction of bentonite with organic bases or salts of organic bases through base exchange wherein the calcium, sodium, potassium, magnesium or other replaceable bases of the silicate of the bentonite enter into double decomposition with cations of organic bases. Such bentonite complexes are manufactured by the National Lead Company of New York, N. Y., and may be considered bentonite salts of quaternary ammonium compounds. In order to simplify their identification the bentonite complexes will be given the trade name Bentone with the numerals following the name Bentone designating the number of carbon atoms in the quaternary compounds from which the bentonite complex is derived. Thus Bentone 34 is a quaternary ammonium bentonite compound obtained through base exchange between bentonite and dimethyl dihexadecyl ammonium chloride. The bentonite salts of quaternary ammonium compounds which we have found to be effective as foam stabilizers include:

1. Bentone 26—dimethyl didodecyl ammonium bentonite.
2. Bentone 30—dimethyl dodecyl hexadecyl ammonium bentonite.
3. Bentone 34—dimethyl dihexadecyl ammonium bentonite.
4. Bentone 36—dimethyl hexadecyl octadecyl ammonium bentonite.
5. Bentone 38—dimethyl dioctadecyl ammonium bentonite.

The quaternary ammonium radical of these dimethyl alkyl quaternary ammonium complexes may be represented as follows:

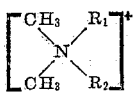

the sum of the carbon atoms being between 26 and 38, and preferably between 30 and 36. This reaction may be descriptively portrayed as one of base exchange in the following:

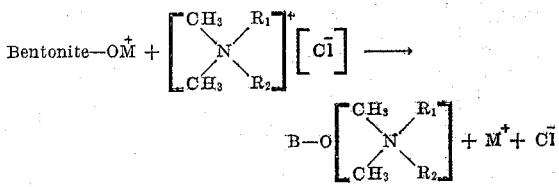

where M represents a univalent cation such as sodium but may represent multivalent cations such as calcium, magnesium, or other replaceable bases of the silicate constituent of the bentonite. The Bentones or quaternary ammonium compounds or complexes may be used individually or in suitable mixtures or blends in the reactant polyisocyanate-polyester resin reactant mixtures in the proportion of from 1 to 10 parts by weight for each 100 parts by weight of the total resin content of the mixture, a preferred range of proportions of the Bentones being between 1.5 and 5 parts by weight for each 100 parts by weight of the total saturated and unsaturated polyester resin content of the mixture. While each of the above named quaternary ammonium bentonite complexes are practical and effective as foam stabilizers, the best results have been obtained with Bentone 34—dimethyl dihexadecyl ammonium bentonite. With certain of the saturated alkyd resins employed in the formulations no foam stabilizers, such as the Bentones, metallic soaps, metallic leafing powders or high molecular weight polymeric resin additives are required. These saturated polyester resins are oil modified and pertain particularly to Resins F, G, H, I, J, and K.

The above mentioned metallic soap powders suitable as foam stabilizer ingredients or additives are metallic soap powders of fatty acids having from 12 to 20 carbon atoms such as: zinc stearate, aluminum stearate, calcium stearate, magnesium stearate, magnesium hydroxy stearate, barium stearate, zinc laureate, calcium oleate, and strontium stearate.

The proportion of the metallic soap powder or blends of metallic soap powder employed may range from 1 to 12, and preferably 2 to 8 parts by weight for each 100 parts by weight of the total resin content of the reactant mixture. The metallic leafing powders which we have found to be effective as foam stabilizers include: aluminum leafing powder, lead leafing powder, nickel leafing powder, silver leafing powder, gold leafing powder, and stainless steel leafing powder.

These metallic leafing powders are employed individually or in suitable mixtures or combinations in the proportion of from 1 to 12 and preferably 2 to 8 parts by weight for each 100 parts by weight of the total resin content of the reactant mixture. Good results are obtained when both a metallic leafing powder and a metallic soap powder are incorporated in the polyisocyanate-alkyd resin mixture. Such a combination of foam stabilizing additives appears to act synergistically, that is the combination causes the foamation of a greater volume of the cellular plastic than if the same proportionate quantity of each individual filler is used separately in the identical polyisocyanate-alkyd resin reactant mixture. When both the metallic leafing powder and metallic soap powder are used the metallic leafing powder may be employed in the proportion of from ½ to 8 parts by weight for each 100 parts by weight of the total resin content and the metallic soap powder may be used in the proportion of from ½ to 8 parts by weight for each 100 parts by weight of the total resin content.

The water content of the reactant mixtures may range from 0.25% to 4% by weight based on the resin content of the mixture.

The following are typical examples of the formulations of the invention for producing the foamed or cellular alkyd resin polyisocyanate reaction products.

*Example 1*

| | Grams |
|---|---|
| Resin I having an acid number of from 35 to 45 | 30 |
| Resin A having an acid number of 15 to 25—3% water content | 30 |
| Benzoyl peroxide | ½ |
| Styrene | 9 |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 20 |

*Example 2*

| | Grams |
|---|---|
| Resin I having an acid number of 50 | 30 |
| Resin A having an acid number of 18—4% water content | 30 |
| Benzoyl peroxide | 0.75 |
| Styrene | 9 |
| Meta-toluene diisocyanate containing 6 parts by weight ethyl cellulose having a viscosity of 100 centipoises and an ethoxy content of from 46.8 to 48.5% for each 100 parts by weight of the meta-toluene diisocyanate | 30 |

*Example 3*

| | Grams |
|---|---|
| Resin I having an acid number of 45 | 30 |
| Resin A having an acid number of 18—1.5% water content | 30 |
| Benzoyl peroxide | ½ |
| Methyl methacrylate | 9 |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 25 |

*Example 4*

| | Grams |
|---|---|
| Resin I having an acid number of 49 | 60 |
| Resin A having an acid number of 18—1¼% water content | 30 |
| Diallyl benzene phosphonate | 12 |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 20 |
| Benzoyl peroxide | 0.6 |

Example 5

| | Grams |
|---|---|
| Resin I having an acid number of 35 | 60 |
| Resin A having an acid number of 18—1% water content | 30 |
| Styrene | 18 |
| Benzoyl peroxide | 2 |
| Meta-toluene diisocyanate containing 2 parts by weight of ethyl cellulose of 100 centipoises viscosity and an ethoxy content of from 48.0 to 49.5% for each 100 parts by weight of the meta-toluene diisocyanate | 20 |

Example 6

| | Grams |
|---|---|
| Resin I having an acid number of 45 | 30 |
| Resin A having an acid number of 18—2% water content | 30 |
| Styrene | 5 |
| Methyl methacrylate | 5 |
| Benzoyl peroxide | ½ |
| Meta-toluene diisocyanate containing 2 parts by weight of ethyl cellulose of 100 centipoises viscosity and having an ethoxy content of from 48.0 to 49.5% for each 100 parts by weight of the meta-toluene diisocyanate | 20 |

Example 7

| | Grams |
|---|---|
| Resin I having an acid number of 49 | 30 |
| Resin A having an acid number of 18—3% water content | 30 |
| Styrene | 9 |
| Benzoyl peroxide | ½ |
| Divinyl benzene | 1 |
| Meta-toluene diisocyanate containing 2 parts by weight of ethyl cellulose having a viscosity of 100 centipoises and an ethoxy content of from 46.8 to 48.5% for each 100 parts by weight of the meta-toluene diisocyanate | 20 |

Example 8

| | Grams |
|---|---|
| Resin I having an acid number of from 35 to 45 | 30 |
| Resin A having an acid number of from 15 to 25 and having a 4% water content | 30 |
| Styrene | 9 |
| Benzoyl peroxide | ½ |
| Bentone 34 | 2 |
| Meta-toluene diisocyanate | 20 |

(If desired the formulation of Example 8 may be modified by employing 25 grams of the meta-toluene diisocyanate and 3 grams of the Bentone 34.)

Example 9

| | Grams |
|---|---|
| Resin I having an acid number of from 35 to 49 | 30 |
| Resin F having an acid number of from 15 to 35 | 30 |
| Water | 1.0 |
| Benzoyl peroxide | ½ |
| Styrene | 9 |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 20 |

Example 10

| | Grams |
|---|---|
| Resin I having an acid number of from 35 to 49 | 30 |
| Resin F having an acid number of from 20 to 30 | 30 |
| Water | 0.3 |
| Benzoyl peroxide | ½ |
| Styrene | 9 |
| Bentone 34 | 2 |
| Meta-toluene diisocyanate | 20 |

Example 11

| | Grams |
|---|---|
| Resin I having an acid number of from 35 to 49 | 30 |
| Resin F having an acid number of 30 | 30 |
| Water | 0.4 |
| Benzoyl peroxide | ½ |
| Meta-toluene diisocyanate | 20 |
| Styrene | 9 |

Example 12

| | Grams |
|---|---|
| Resin I having an acid number of from 35 to 49 | 30 |
| Resin G having an acid number of from 20 to 30 | 30 |
| Styrene | 9 |
| Water | 0.6 |
| Benzoyl peroxide | 0.5 |
| Meta-toluene diisocyanate containing 2 parts by weight of ethyl cellulose having a viscosity of 100 centipoises and an ethoxy content of from 48.0 to 49% for each 100 parts by weight of the meta-toluene diisocyanate | 20 |

Example 13

| | Grams |
|---|---|
| Resin I having an acid number of from 35 to 49 | 30 |
| Resin G having an acid number of 28 | 30 |
| Water | 0.4 |
| Benzoyl peroxide | ½ |
| Bentone 34 | 1 |
| Styrene | 9 |
| Meta-toluene diisocyanate | 25 |

Example 14

| | Grams |
|---|---|
| Resin II having an acid number of 35 | 30 |
| Resin F having an acid number of 30 | 30 |
| Water | 0.5 |
| Benzoyl peroxide | 0.75 |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 25 |
| Styrene | 9 |

Example 15

| | Grams |
|---|---|
| Resin I having an acid number of 45 | 30 |
| Resin E having an acid number of 15 | 30 |
| Water | 0.6 |
| Styrene | 9 |
| Benzoyl peroxide | ½ |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 20 |

Example 16

| | Grams |
|---|---|
| Resin III having an acid number of 35 | 30 |
| Resin H having an acid number of 10—1% water content | 30 |
| Styrene | 9 |
| Benzoyl peroxide | ½ |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 25 |

Example 17

| | Grams |
|---|---|
| Resin I having an acid number of 49 | 30 |
| Resign A having an acid number of 18—1½% water content | 30 |
| Benzoyl peroxide | ½ |
| Styrene | 9 |
| Zinc stearate soap powder | 3 |
| Meta-toluene diisocyanate | 20 |

(The formulation of Example 17 may be modified by employing aluminum leafing powder instead of the zinc stearate soap powder in the same proportion.)

Example 18

| | Grams |
|---|---|
| Resin I having an acid number of 49 | 30 |
| Resin F having an acid number of 30 | 30 |
| Water | 0.4 |
| Benzoyl peroxide | ½ |
| Styrene | 9 |
| Aluminum leafing powder | 2 |
| Meta-toluene diisocyanate | 25 |

Example 19

| | Grams |
|---|---|
| Resin I having an acid number of 49 | 30 |
| Resin G having an acid number of 28 | 30 |
| Water | 0.4 |
| Benzoyl peroxide | ½ |
| Styrene | 9 |
| Aluminum leafing powder | 1 |
| Meta-toluene diisocyanate | 25 |

Example 20

| | Grams |
|---|---|
| Resin I (One) having an acid number of 49 | 30 |
| Resin I having an acid number of 57 | 30 |
| Styrene | 9 |
| Water | 0.7 |
| Benzoyl peroxide | ½ |
| Meta-toluene diisocyanate containing 2 parts by weight of ethyl cellulose having a viscosity of 100 centipoises and an ethoxy content of from 48.0 to 49.5% for each 100 parts by weight of the meta-toluene diisocyanate | 20 |

Example 21

| | Grams |
|---|---|
| Resin I (One) having an acid number of 36 | 30 |
| Resin I having an acid number of 55 | 30 |
| Styrene | 9 |
| Water | 0.6 |
| Benzoyl peroxide | ½ |
| Meta-toluene diisocyanate | 20 |

Example 22

| | Grams |
|---|---|
| Resin II (two) having an acid number of 35 | 30 |
| Resin I, having an acid number of 59 | 30 |
| Styrene | 9 |
| Water | 0.4 |
| Lauroyl peroxide | ½ |
| Meta-toluene diisocyanate | 20 |

Example 23

| | Grams |
|---|---|
| Resin I, having an acid number of 40 | 30 |
| Resin A, having an acid number of 18—2% water content | 30 |
| Lauroyl peroxide | ¼ |
| Styrene | 9 |
| Meta-toluene diisocyanate containing 2 parts by weight of ethyl cellulose having an ethoxy content of 48.0 to 49.5% and a viscosity of 100 centipoises, for each 100 parts by weight of the meta-toluene diisocyanate | 20 |

Example 24

| | Grams |
|---|---|
| Resin I (one) having an acid number of 45 | 30 |
| Resin I having an acid number of 55 | 30 |
| Styrene | 9 |
| Water | 0.6 |
| Bis (2,4-dichlorobenzoyl) peroxide | ¾ |
| Meta-toluene diisocyanate | 20 |

Example 25

| | Grams |
|---|---|
| Resin III having an acid number of 35 | 20 |
| Resin I having an acid number of 60 | 40 |
| Styrene | 6 |
| Water | 0.3 |
| Benzoyl peroxide | ¼ |
| Lauroyl peroxide | ¼ |
| Meta-toluene diisocyanate | 20 |

Example 26

| | Grams |
|---|---|
| Resin I having an acid number of from 35 to 45 | 23 |
| Resin A having an acid number of 18—2½% water content | 40 |
| Styrene | 7 |
| Benzoyl peroxide | ½ |
| Bentone 34 | 2 |
| Meta-toluene diisocyanate | 25 |

Example 27

| | Grams |
|---|---|
| Resin I having an acid number of 42 | 30 |
| Resin A having an acid number of 18—4% water content | 30 |
| Styrene | 9 |
| Bentone 34 | 3 |
| Aluminum leafing powder | 3 |
| Benzoyl peroxide | 1 |
| Meta-toluene diisocyanate | 25 |

In preparing the reactant mixtures the ingredients are simply thoroughly mixed together and the mixture is then poured in place or otherwise applied. The poured or applied mixture is then allowed to react at atmospheric pressure either with or without the application of external heat or attended by a moderate heating of say between 120° and 150° F. depending upon the size of the batch. The mixture is allowed to react and the reaction is allowed to go on to completion to produce the foamed cellular plastic product. A post-curing at temperature of from 120° to 250° F. and for up to 24 hours may be desirable although in other cases the exothermic heat is all that is required.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. The cellular plastic material which is the reaction product, in parts by weight of, 30 parts of an unsaturated polyester resin prepared from approximately 6.3 mols diethylene glycol, 5 mols fumaric acid and 1 mol sebacic acid and having an acid number of from 25 to 60, 30 parts of a saturated polyester resin having an acid number of from 15 to 25 prepared from approximately 4 mols trimethylol propane, 2.5 mols adipic acid and ½ mol phthalic anhydride, the resins having a water content of approximately 1½% of the total weight of the two resins, 9 parts of styrene, ½ part of benzoyl peroxide, and 20 parts of meta-toluene diisocyanate containing 2 parts by weight of ethyl cellulose for each 100 parts by weight of the meta-toluene diisocyanate, the ethyl cellulose having an ethoxy content of from 48.0 to 49.5% by weight and a viscosity of 100 centipoises as determined from a 5% by weight concentration in a solution of from 70 to 80 parts by weight of toluene with from 30 to 20 parts by weight of denatured 2B ethyl alcohol of 95% strength, the solution being at approximately 25° C.

2. The cellular plastic material which is the reaction product, in parts by weight of, 30 parts of an unsaturated polyester resin prepared from approximately 6.3 mols diethylene glycol, 5 mols fumaric acid and 1 mol sebacic acid and having an acid number of from 35 to 45, 30 parts of a saturated polyester resin having an acid number of from 15 to 25 prepared from approximately 4 mols trimethylol propane, 2.5 mols adipic acid and ½ mol phthalic anhydride, the resins having a water content of approximately 2% of the total weight of the two resins, 9 parts of styrene, ½ part of benzoyl peroxide, 2 parts dimethyl dihexadecyl ammonium bentonite, and 20 parts meta-toluene diisocyanate.

3. The cellular plastic material which is the reaction product, in parts by weight of, 30 parts of an unsaturated polyester resin prepared from approximately 6.3 mols diethylene glycol, 5 mols fumaric acid and 1 mol sebacic acid and having an acid number of from 35 to 49, 30 parts of a saturated resin having an acid number of from 20 to 30 prepared from 4 mols trimethylol propane, ½ mol phthalic anhydride, ½ mol of dimerized linoleic acids and 2 mols adipic acid, 9 parts styrene, 0.6 part water, 0.5 part benzoyl peroxide, and 20 parts meta-toluene diisocyanate containing 2 parts by weight for each 100 parts by weight of the meta-toluene diisocyanate of ethyl cellulose having an ethoxy content of from 48.0 to 49.5% by weight and a viscosity of 100 centipoises as determined from a 5% by weight concentration in a solution of from 70 to 80 parts by weight of toluene with from 30 to 20 parts by weight of denatured 2B ethyl alcohol of 95% strength, the solution being at approximately 25° C.

4. The cellular plastic reaction product of, in approximate parts by weight, a polymerizable unsaturated polyester resin containing a plurality of ethylenic groups derived from alpha, beta-ethylenically unsaturated dicarboxylic acids having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion range of from 20 parts of the unsaturated resin to 60 parts of the saturated resin to 60 parts of the unsaturated resin to 20 parts of the saturated resin, water in the proportion of from 0.25 to 4.0% by weight of the total weight of the resins, an organic peroxide polymerization catalyst in the proportion of from ½ to 5% by weight of the unsaturated resin, from 10 to 50 parts of a polymerizable ethylenically-unsaturated monomer for each 100 parts of said unsaturated resin, and from 17 to 80 parts of meta-toluene diisocyanate for each 100 parts of the total combined resins, said meta-toluene diisocyanate containing from 0.03 to 15 parts ethyl cellulose for each 100 parts of the meta-toluene diisocyanate, the ethyl cellulose having an ethoxyl content of from 45.0 to 49.5% and a viscosity of 100 centipoises as determined from a 5% by weight concentration in a solution of from 70 to 80 parts by weight of toluene with from 30 to 20 parts by weight of denatured 2B ethyl alcohol of 95% strength, the solution being at approximately 25° C.

5. The cellular plastic reaction product of, in approximate parts by weight, an unsaturated polyester derived from a dihydric alcohol and an alpha, beta-ethylenically unsaturated dicarboxylic acid and having an acid number of from 25 to 60 and wherein the ratio of the hydroxyl groups to carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion range of from 20 parts of the unsaturated resin to 60 parts of the saturated resin to 60 parts of the unsaturated resin to 20 parts of the saturated resin, water in the proportion of from 0.25 to 4% by weight of the total weight of the resins, benzoyl peroxide in the amount of from ½ to 5% by weight of the unsaturated resin, from 10 to 50 parts for each 100 parts of said unsaturated resin of a monomer selected from the group consisting of styrene, methyl methacrylate, butyl methacrylate, acrylonitrile, diallyl phthalate, diallyl benzene phosphonate, vinyl acetate, glycol diacrylate, diallyl maleate, methyl-chloro acrylate, styrene-divinyl benzene mixtures, from 1 to 10 parts for each 100 parts of the total resin content of a foam stabilizer selected from the group consisting of dimethyl didodecyl ammonium bentonite, dimethyl dodecyl hexadecyl ammonium bentonite, dimethyl dihexadecyl ammonium bentonite, dimethyl dihexadecyl ammonium bentonite, dimethyl hexadecyl octadecyl ammonium bentonite, dimethyl dioctadecyl ammonium bentonite, and from 17 to 80 parts of meta-toluene diisocyanate for each 100 parts of the total resin content.

6. A foam product obtained by the reaction of, in approximate parts by weight, a polymerizable unsaturated polyester containing a plurality of ethylenic groups derived from alpha, beta-ethylenically unsaturated dicarboxylic acids and having an acid number of from 25 to 60 and wherein the ratio of the hydroxyl groups to the carboxyl groups of the alkyd reactants is approximately 1 to 1, a saturated polyester resin of the class which when catalyzed with an organic perodixe polymerization catalyst will not cross link with polymerizable ethylenically-unsaturated compounds to form the thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, an organic peroxide polymerization catalyst in the proportion of from ½ to 5% by weight of the unsaturated resin, from 10 to 50 parts of polymerizable ethylenically unsaturated monomer for each 100 parts of the unsaturated resin, and from 17 to 80 parts of meta-toluene diisocyanate for each 100 parts of the total combined resins.

7. A foam product obtained by the reaction of, in approximate parts by weight, an unsaturated polyester derived from a dihydric alcohol and an alpha, beta-ethylenically unsaturated dicarboxylic acid having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, a catalyst in the proportion of from ½ to 5% by weight of the unsaturated resin selected from the group consisting of: benzoyl peroxide, lauroyl peroxide, bis (2,4 dichlorobenzoyl) peroxide, from 10 to 50 parts of an unsaturated ethylenic-containing monomer for each 100 parts of the unsaturated resin selected from the group consisting of styrene, methyl methacrylate, butyl methacrylate, acrylonitrile, diallyl phthalate, diallyl benzene phosphonate, vinyl acetate, glycol diacrylate, diallyl maleate, methylchloro acrylate, styrene-divinyl benzene mixtures, and from 17 to 80 parts of meta-toluene diisocyanate for each 100 parts of the total combined resins.

8. A foam product obtained by the reaction of, in approximate parts by weight, a polymerizable unsaturated polyester resin containing a plurality of ethylenic groups derived from alpha, beta-ethylenically unsaturated dicarboxylic acids and having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, a catalyst in the proportion of from ½ to 5% by weight of the unsaturated resin selected from the group consisting of benzoyl peroxide, lauroyl peroxide, bis (2,4-dichlorobenzoyl) peroxide, from 10 to 50 parts of a polymerizable ethylenically-unsaturated monomer for each 100 parts of the unsaturated resin, and from 17 to 80 parts of meta-toluene diisocyanate for each 100 parts of the total combined resins.

9. A foam product obtained by the reaction of, in approximate parts by weight, an unsaturated polyester derived from a dihydric alcohol and an alpha, beta-ethylenically unsaturated dicarboxylic acid having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form the thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, a peroxide catalyst in the proportion of from ½ to 5% by weight of the unsaturated resin selected from the group consisting of benzoyl peroxide, lauroyl peroxide, bis (2,4 dichlorobenzoyl) peroxide, from 10 to 50 parts of a polymerizable ethylenically-unsaturated monomer for each 100 parts of the unsaturated resin, from 1 to 10 parts of a quaternary ammonium salt of bentonite for each 100 parts of the total resin content, and from 17 to 80 parts of meta-toluene diisocyanate for each 100 parts of the total combined resins.

10. A foam product obtained by the reaction of, in approximate parts by weight, a polymerizable unsaturated polyester containing a plurality of ethylenic groups derived from alpha, beta-ethylenically unsaturated dicarboxylic acids and having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, a catalyst in the proportion of from ½ to 5% by weight of the unsaturated resin selected from the group consisting of: benzoyl peroxide, lauroyl peroxide, bis (2,4 dichlorobenzoyl) peroxide, from 10 to 50 parts of ethylenically-unsaturated monomer for each 100 parts of the unsaturated resin, from 1 to 10 parts for each 100 parts of the total resin content of a foam stabilizer selected from the group consisting of dimethyl didodecyl ammonium bentonite, dimethyl dodecyl hexadecyl ammonium bentonite, dimethyl dihexadecyl ammonium bentonite, dimethyl hexadecyl octadecyl ammonium bentonite, dimethyl dioctadecyl ammonium bentonite, and from 17 to 80 parts of meta-toluene diisocyanate for each 100 parts of the total combined resins.

11. A foam product obtained by the reaction of, in approximate parts by weight, a polymerizable unsaturated polyester containing a plurality of ethylenic groups derived from alpha, beta-ethylenically unsaturated dicarboxylic acids and having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, a catalyst in the proportion of from ½ to 5% by weight of the unsaturated resin selected from the group consisting of: benzoyl peroxide, lauroyl peroxide, bis (2,4 dichlorobenzoyl) peroxide, from 10 to 50 parts of a polymerizable ethylenically-unsaturated monomer for each 100 parts of the unsaturated resin, from 1 to 12 parts for each 100 parts of the total resin content of metallic soap powders selected from the group consisting of zinc stearate, aluminum stearate, calcium stearate, magnesium stearate, magnesium hydroxy stearate, barium stearate, zinc laurate, calcium oleate, strontium stearate, and from 17 to 80 parts of meta-toluene diisocyanate for each 100 parts of the total combined resins.

12. A foam product obtained by the reaction of, in approximate parts by weight, a polymerizable unsaturated polyester containing a plurality of ethylenic groups derived from alpha, beta-ethylenically unsaturated dicarboxylic acids and having an acid number of from 25 to 60 and wherein the ratio of the hydroxyl groups to the carboxyl groups of the alkyd reactants is approximately 1 to 1, a saturated polyester resin of the class which when catalyzed with an organic peroxide polymerization catalyst will not cross link with polymerizable ethylenically-unsaturated compounds to form thermosetting polymers, said resins being in the proportion of from 20 parts of the unsaturated resin to 60 parts of the saturated resin to 60 parts of the unsaturated resin to 20 parts of the saturated resin, water in the proportion of from 0.25% to 4.0% by weight of the total weight of the resins, an organic peroxide polymerization catalyst in the proportion of from ½ to 5% by weight of the unsaturated resin, from 10 to 50 parts of ethylenically-unsaturated monomer for each 100 parts of the unsaturated resin, from 1 to 12 parts for each 100 parts of the total resin content of a metallic leafing powder selected from the group consisting of aluminum leafing powder, lead leafing powder, nickel leafing powder, silver leafing powder, gold leafing powder, stainless steel leafing powder, and from 17 to 80 parts of meta-toluene diisocyanate for each 100 parts of the total combined resins.

13. The cellular foamed reaction product in approximate parts by weight of, 30 parts of an unsaturated polyester resin prepared from approximately 6.3 mols diethylene glycol, 5 mols fumaric acid and 1 mol sebacic acid and having an acid number of from 35 to 49, 30 parts of a saturated polyester resin having an acid number of from 15 to 35 prepared from approximately 4 mols trimethylol propane, ½ mol dimerized linoleic acids, ½ mol phthalic anhydride, 1 mol adipic acid, 1 part water, ½ part benzoyl peroxide, 9 parts styrene, and 20 parts meta-toluene diisocyanate containing 2 parts for each 100 parts of the meta-toluene diisocyanate of ethyl cellulose having an ethoxy content of from 48.0 to 49.5% and having a viscosity of approximately 100 centipoises as determined from a 5% by weight concentration in a solution of from 70 to 80 parts by weight of toluene with from 30 to 20 parts by weight of denatured 2B ethyl alcohol of 95% strength, the solution being at approximately 25° C.

14. The cellular foamed reaction product in approximate parts by weight of, 30 parts of an unsaturated polyester resin prepared from approximately 6.3 mols diethylene glycol, 5 mols fumaric acid and 1 mol sebacic acid and having an acid number of from 35 to 49, 30 parts of a saturated polyester resin having an acid number of approximately 28 prepared from approximately 4 mols trimethylol propane, ½ mol dimerized linoleic acids, ½ mol phthalic anhydride, and 2 mols adipic acid, 0.4 part water, ½ part benzoyl peroxide, 1 part dimethyl dihexadecyl ammonium bentonite, 9 parts styrene, and 25 parts meta-toluene diisocyanate.

ELI SIMON.
FRANK W. THOMAS.

No references cited.